Figure 1:
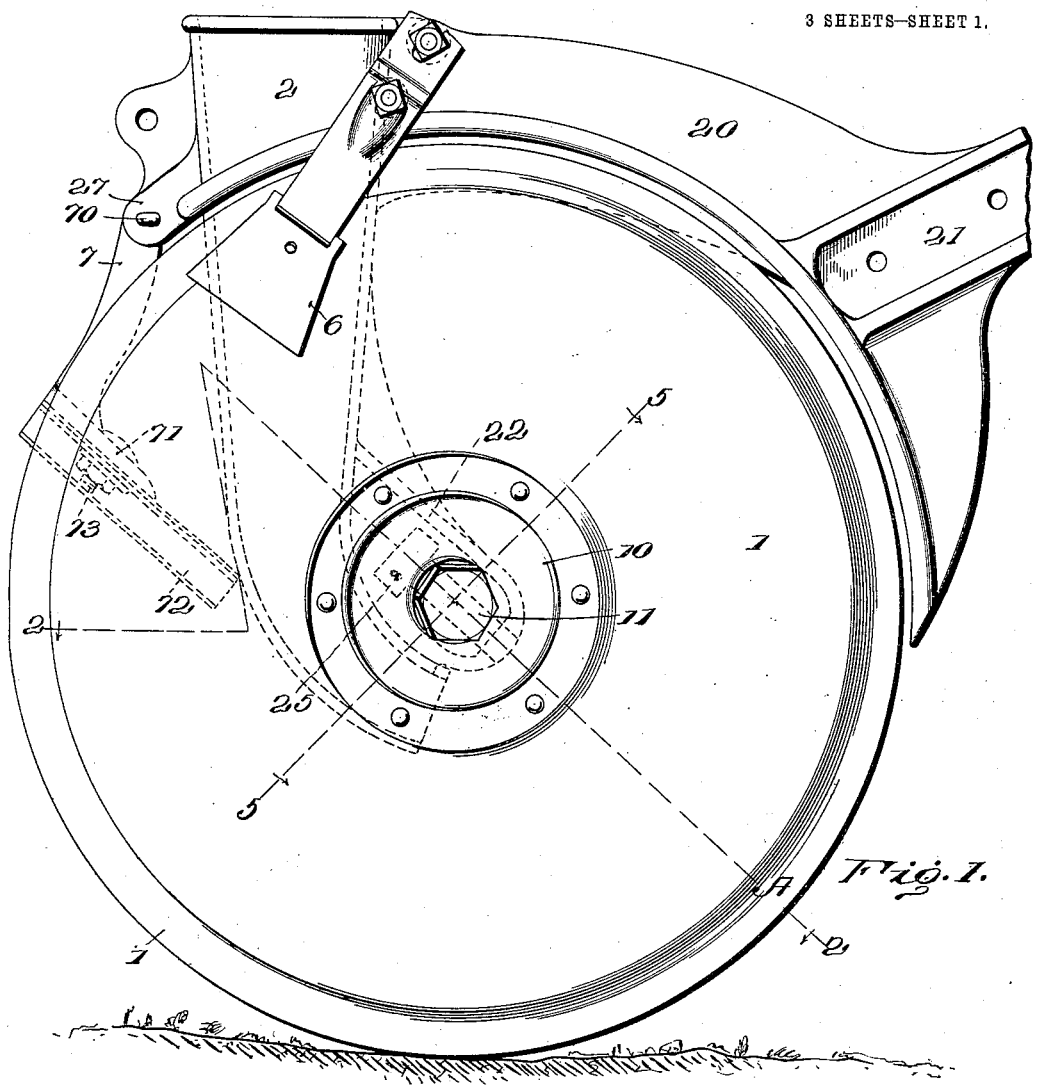

W. ELLIOTT, H. M. LOEBER & R. H. SCHLACHTER.
DOUBLE DISK GRAIN DRILL.
APPLICATION FILED APR. 18, 1912.

1,077,338.

Patented Nov. 4, 1913.

3 SHEETS—SHEET 1.

Witnesses
W. A. Williams.
E. R. Peck

Inventors
William Elliott
H. M. Loeber
R. H. Schlachter
By Hubert E. Peck, Attorney W. ELLIOTT, H. M. LOEBER & R. H. SCHLACHTER.
DOUBLE DISK GRAIN DRILL.
APPLICATION FILED APR. 18, 1912.
1,077,338.
Patented Nov. 4, 1913.
3 SHEETS—SHEET 2.
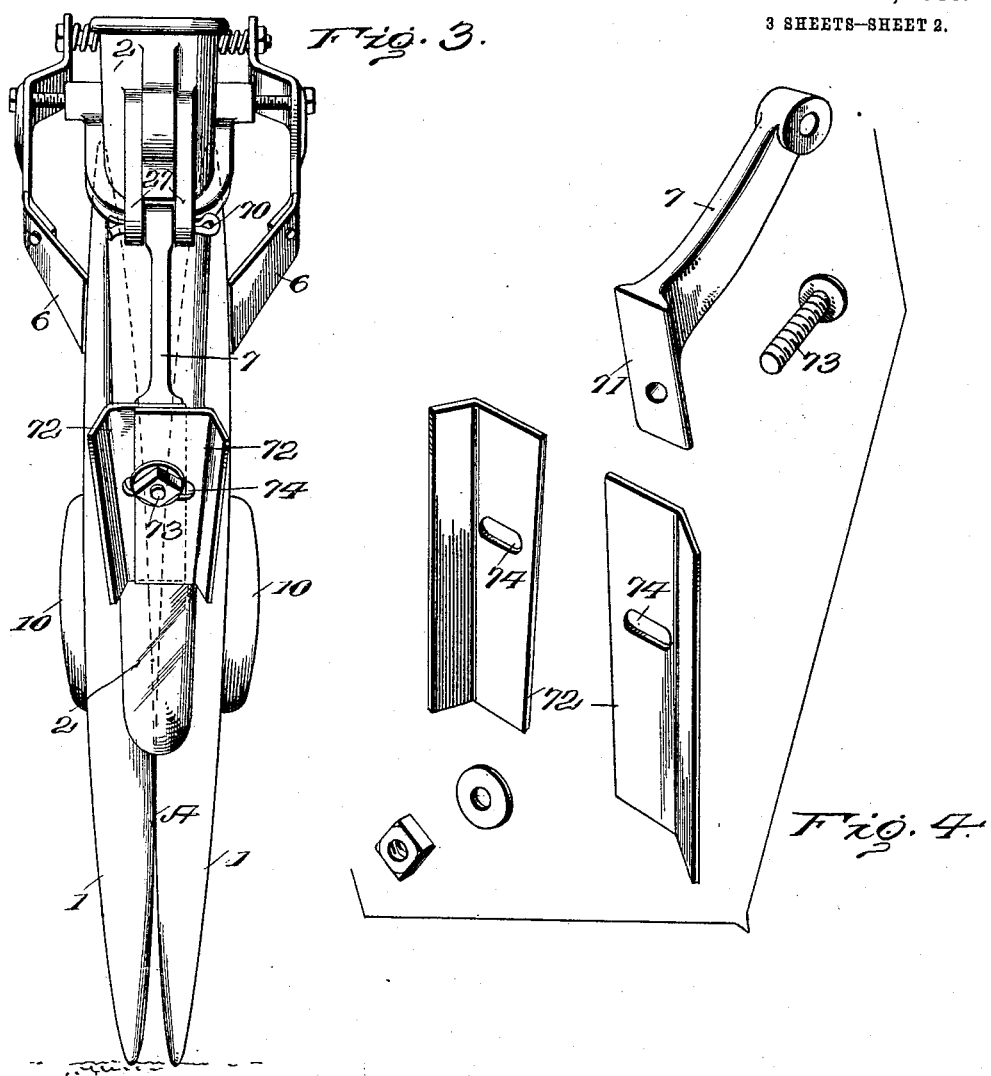
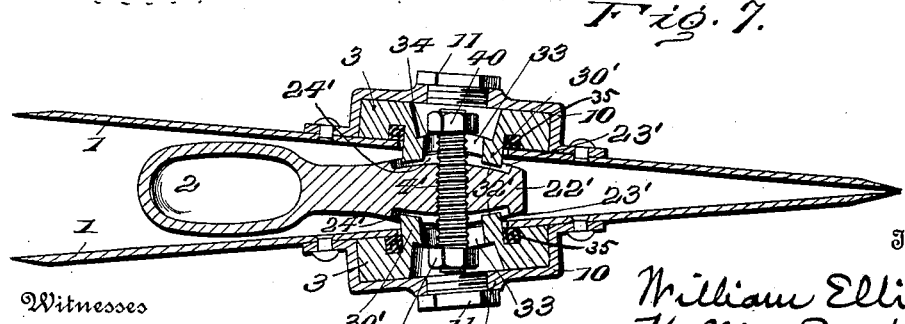

W. ELLIOTT, H. M. LOEBER & R. H. SCHLACHTER.
DOUBLE DISK GRAIN DRILL.
APPLICATION FILED APR. 18, 1912.
1,077,338.
Patented Nov. 4, 1913.
3 SHEETS—SHEET 3.
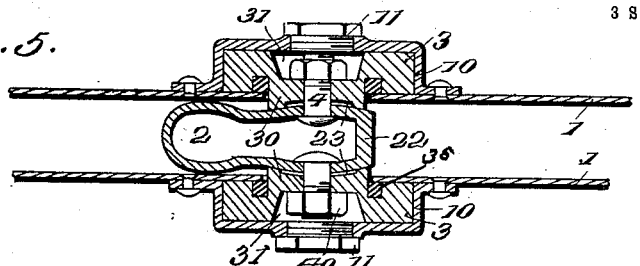
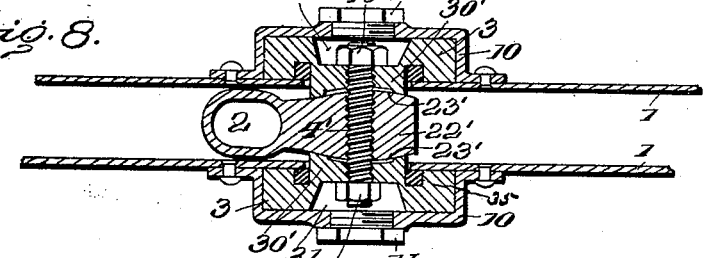
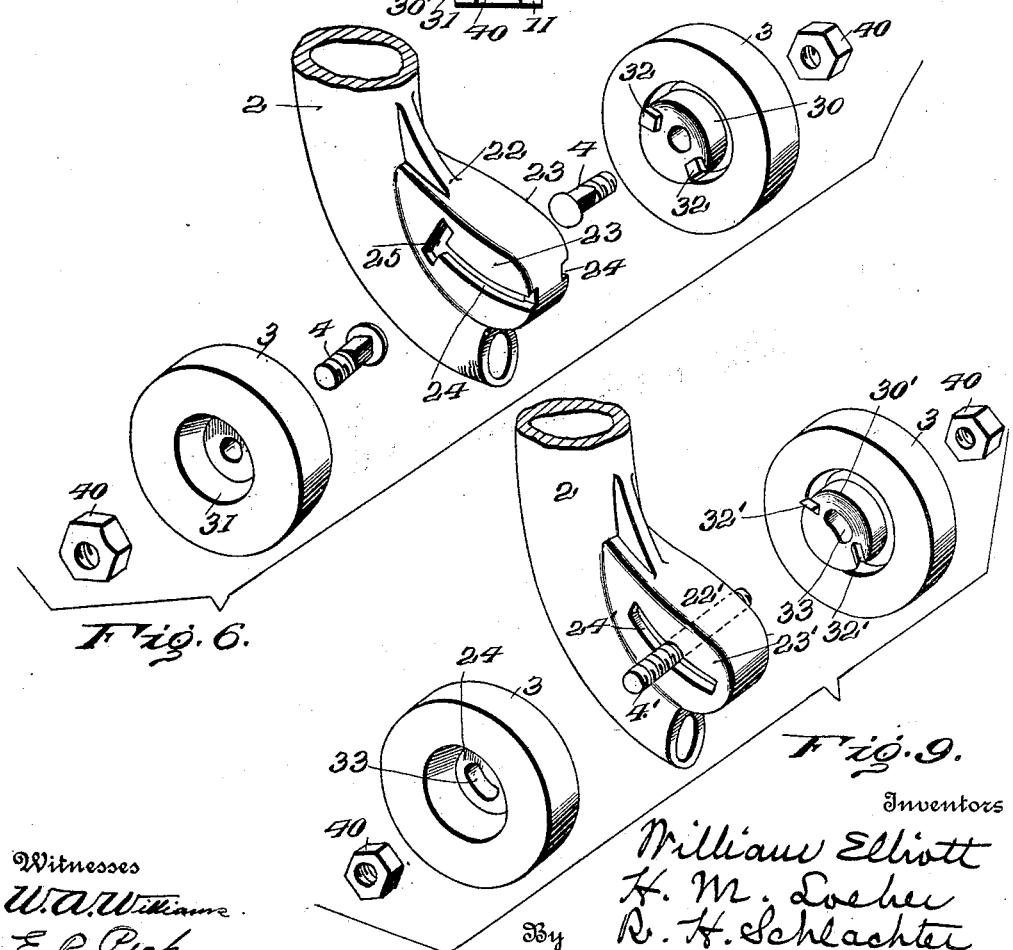
Witnesses
W. A. Williams
E. R. Pick
Inventors
William Elliott
H. M. Loeber
R. H. Schlachter
By Hubert Pick Attorney

UNITED STATES PATENT OFFICE.

WILLIAM ELLIOTT, HERMAN M. LOEBER, AND ROBERT H. SCHLACHTER, OF BEATRICE, NEBRASKA, ASSIGNORS TO DEMPSTER MILL MANUFACTURING COMPANY, OF BEATRICE, NEBRASKA, A CORPORATION OF NEBRASKA.

DOUBLE-DISK GRAIN-DRILL.

1,077,338.  Specification of Letters Patent.  Patented Nov. 4, 1913.

Application filed April 18, 1912. Serial No. 691,649.

*To all whom it may concern:*

Be it known that we, WILLIAM ELLIOTT, HERMAN M. LOEBER, and ROBERT H. SCHLACHTER, citizens of the United States, residing at Beatrice, in the county of Gage and State of Nebraska, have invented certain new and useful Improvements in Double-Disk Grain-Drills, of which the following is a specification.

This invention relates to certain improvements in grain drills and relates more particularly to improvements in and relating to double disk grain drills; and the objects and nature of the invention will be readily understood by those skilled in the art in the light of the following explanation of the accompanying drawings showing what we now believe to be the preferred embodiments from among other formations, combinations and arrangements within the spirit and scope of our invention.

An object of the invention is to provide certain improvements, in grain drills of the type wherein the furrow is opened by two rolling cutters or rotary disks, for the purpose of rendering the disks readily adjustable to maintain the desired cutting edge contact between the disks.

A further object of the invention is to provide improved means for coupling or otherwise mounting the furrow opening disks to the boot or other frame supporting the same, for the purpose of rendering each disk independently adjustable to vary its angle of inclination with respect to the other disk in maintaining the desired contact between the advanced edges of the disks of a double disk furrow opener.

A further object of the invention is to provide a double disk furrow opener with improved means for independently mounting and adjusting the disks.

A further object of the invention is to provide an improved independent mounting for the disks of double disk furrow openers.

The invention consists in certain novel features in construction and in combinations and arrangements as more fully and particularly set forth hereinafter.

Figure 2:
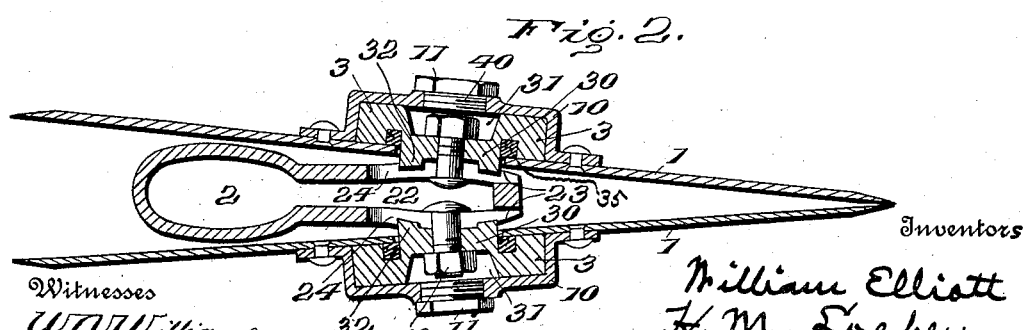

Referring to the accompanying drawings. Figure 1, is a side elevation of a seed or grain drill embodying our invention. Fig. 2, is a section on the line 2—2, Fig. 1. Fig. 3, is a rear elevation. Fig. 4, is a detail perspective of the rear hinged or pivoted scraper, with parts thereof separated to illustrate the construction thereof and manner of adjusting the same. Fig. 5, is a section on the line 5—5, Fig. 1. Fig. 6, is a detail perspective view showing the lower discharge end of the seed conduit of the boot or frame, the bearing blocks of the two disks, and the clamping bolts for adjustably securing said blocks to the boot or frame, said parts being shown separated, the disks and their hubs or journal boxes not being shown. Fig. 7, is a sectional view, corresponding to Fig. 2, but illustrating a modification. Fig. 8, is a sectional view illustrating said modification and corresponding to Fig. 5. Fig. 9, is a detail perspective illustrating said modification and corresponding to Fig. 6.

The drill disclosed comprises the two similar rolling cutters or rotary disks 1, so set or mounted as to rotate on inclined axes and converge forwardly and downwardly with their cutting edges contacting (about at A) at the front and below the horizontal plane that includes their axes. The supporting frame to or on which the disks are mounted consists of the boot 2, rigid with a forwardly and downwardly curved arm 20, arranged over the disks and covering the space between the same from the boot forwardly and downwardly to a point above the contacting portions of the disk cutting edges. This arm or portion 20, of the frame constitutes a guard or shield to exclude trash from the space between the disks, and is provided with a seat or arm 21, for the attachment of the drag or draft bar or other part by or through which the particular drill element is drawn forward.

The boot 2, is vertically disposed and extends downwardly between the two disks and in rear of the vertical planes of the axes thereof and at its lower end curves forwardly approximately below said axes of rotation so that the seed conduit formed by the hollow boot curves forwardly at its lower open or discharge end and discharges the seed forwardly and downwardly below the centers of the disks although we do not wish to so limit all features of our invention. The lower end portion of the boot is formed with a front extension 22, above its seed discharge outlet and arranged between the centers of the two disks and providing means for the attachment of the bearings or journals of the disks to the boot. The opposite side faces of this extension of the boot are formed to provide seats or bearing faces for the reception and adjustment of the disk mountings, i. e. the journals or bearings carrying the disks. In the construction illustrated by Figs. 1, 2, 5 and 6, the extension or portion 22, of the boot is formed hollow and has its similar opposite preferably smooth side faces 23, elongated in the plane of the line 2—2, Fig. 1, and longitudinally curved, arched, or convexed so that the extension in longitudinal section (Fig. 2) is of an approximately elliptical formation with said curved side faces converging forwardly from the highest portions of their curvatures or from points in rear of their front ends. The extension is formed with approximately central elongated slots 24, opening through said side faces and extending longitudinally thereof, and at their rear ends said slots are enlarged laterally at 25. The side faces 23, are also preferably rounded or arched transversely as shown by Fig. 5. These faces 23, are formed to receive the inner ends of the disk journals or bearings and permit adjustment thereof thereon, and the hollow interior of the extension and the slots to receive the journal clamping or securing bolts and their heads and permit movement thereof with the journals during adjustment.

In the specific example illustrated, each disk is confined to and rotates on an enlarged cylindrical or disk-like bearing block 3, fitting against the outer surface of the disk and formed with a reduced central or concentric boss 30, projecting from its inner end through and beyond the center of the disk. A centrally dished plate 10, is riveted to the outer side of the disk and surrounds the bearing block and forms the hollow hub of the disk inclosing the bearing block. The bearing block is formed with a central recess or depression 31 in its outer end to form a lubricant chamber and to receive the nut of the clamping bolt. The plate 10, is formed with a central opening whereby access can be had to said recess and the nut therein and this opening is normally closed by suitable means, such as removable screw cap 11. The bearing block is clamped and secured to the boot by bolt 4, having its head in the interior of the extension 22, and its shank passing through the slot 24, and centrally and removably through the boss 30 and block 3, and secured by nut 40, in the recess 31, and abutting the outer face of the block. Either disk can be removed with its bearing block by unscrewing and removing nut 40, and then withdrawing the disk so that its block slips from the bolt 4, leaving the bolt in the extension 22. The bolt 4, can be applied to or removed from the extension by passing the bolt head in an edgewise or tilted position through the enlarged end 25, of the slot 24. The bolt can be moved longitudinally of the extension the length of the slot 24. The end faces of the bosses 30, are usually concaved to conform to the exterior convexity of the faces or seats 23, and center the bosses thereon, and are formed with lugs 32, to enter the slots 24, and hold the bearing blocks against rotation. The diameter of a boss 30, is less than the length of a curved seat or face 23, so that when a bolt 4, is loosened by loosening its nut 40, the disk 1, thereof can be moved to slip its bearing block boss forwardly or rearwardly on and longitudinally of the seat with its bolt moving in the slot and the bolt head sliding on the correspondingly curved inner face of the hollow extension 22. The disks are independently mounted and can be thus independently adjusted. The longitudinal convexity of the seats 23, is such that the disk journals can be rocked thereon in adjusting, approximately as though swung from a center or axial line (about such as 5—5, Fig. 1) at right angles to the diametrical line 2—2, that intersects the point of contact A, between the cutting edges of the forwardly converging disks. By this arrangement, the portion A, of either disk can be brought into the desired intimate contact with the edge of the other disk, by a minimum forward movement of the bearing block boss on its seat 23, and with a minimum forward or advancing movement of the entire disk toward the front shield or guard 20. The curved forwardly converging portions of the seats 23, attain maximum lateral movement of the front edges of the disks with minimum longitudinal movement of the bearing blocks on the seats 23. This is an exceedingly desirable feature in drills of this character as it is hence possible to always maintain the front guard 20, in close trash excluding relation with respect to the front opening between the two disks even when the disks are at their limit of rearward adjustment.

As those skilled in the art understand, it is highly desirable, in double disk grain drills for proper operation, to maintain the close contact at the proper point between the front portions of the disk cutting edges, and also to exclude trash from the opening between the upwardly diverging edges of the disks above said point of contact. The disks even when set to properly engage at their cutting edges, will by continued use, become separated with resulting disadvantages, hence the necessity of providing for adjustment whereby one or both disks can be readily adjusted, with a minimum bodily forward movement of the disk, to restore the desired contact between the disk edges. The rearwardly converging portions of the seats 23, that is, the portions thereof in rear of the highest portions of the seats, are particularly designed to provide for special adjustment of each disk where necessary to take up or allow for abnormal inequality in the surfaces of disks, for in practice it is found that the disks are not uniform but some are slightly convexed, others concaved, and some straight or flat.

In Figs. 7, 8, and 9, we show a modification, whereby the boot or head or extension 22', is solid, and a threaded bolt 4', extends centrally and transversely therethrough and is fixed thereto and projects in opposite directions from the opposite side seats or faces 23', thereof. The seats 23', are curved longitudinally and converge forwardly and have central longitudinal grooves 24', to receive the lugs or ribs 32', on the end faces of the bearing block bosses 30', for holding the bearing blocks against rotation. The fixed bolt ends project outwardly through diametrical slots 33, in the bearing blocks, and the blocks are clamped to the boot head by nuts 40, on the bolt ends and in the recesses in the outer ends of the bearing blocks. The ends of the blocks forming the floors of the recesses are convexed, see 34, to receive the nuts 40, and to approximately correspond to the curvature of the seats 23'. When a nut 40, is loosened, the disk thereof can be swung or rocked to move its front edge laterally, and its bearing block will slide on the face 23', and beside the fixed bolt and the nut thereon. The disk can be readily locked in the desired adjustment by tightening the nut 40. If so desired, the bearing blocks can be formed with annular grooves or sockets in their inner end faces around their bosses to receive packing washers or gaskets 35, designed to bear against the inner surfaces of the disks about the central openings therethrough for retaining lubricant and excluding grit.

6, are spring held scrapers arranged at and bearing on the outer surfaces of the disks.

We provide a scraper for cleaning the inner surfaces of the disks, and this scraper is carried by a freely vertically swingable depending arm 7, suitably mounted at its upper end to swing on a transverse axis. At its lower free end this arm carries one or more scraper blades fitting between the disks and having edges engaging the same to remove the dirt therefrom as the disks revolve. The scraper maintains its operative position between the disks by gravity and by the direction of rotation of the disks and freely rises and falls to adapt itself to inequalities thereof and to variations in the width of the space therebetween, and if desired, the scraper can be readily swung up from its normal operative position between the disks. In the particular example illustrated, the upper end of the arm 7, is removably hinged or pivoted to lugs 27, formed on the rear of the boot 2, above the space between the rear portions of the disks, by a transverse removable pin 70, such as a cotter pin, passed through alined perforations in the lugs and arm end. The lugs 27, are preferably spaced a sufficient distance apart and the perforation in the arm end is preferably enlarged to permit lateral play of the scraper in properly positioning itself between the disks to maintain scraping relation with both disks. In the specific example illustrated, the free end of the arm 7, is formed with a head 71, to which the scraper is secured. The scraper considered as a whole is longitudinally elongated and double-edged, and tapers or reduces in width from its upper end to its lower end to conform to the angle of the disks, and extends from the upper rear edges of the disks about tangentially of the disks downwardly and forwardly to or about to the rear edge of the lower portion of the boot. This scraper can be composed of two separate blades 72, overlapping each other on the head 71, and clamped thereto by a bolt 73, passed through alined transverse slots 74, in the blades permitting separate or independently lateral adjustment of the blades to take up wear or to increase or decrease the width of the scraper as a whole. The outer longitudinal edge portions of the blades are usually transversely inclined or bent rearwardly in opposition to the forward travel of the portions of the disks engaged thereby when in action. This scraper is exceedingly efficient in action and automatically adjusts itself to the disks in maintaining scraping position.

It is evident that various changes, modifications and variations might be resorted to without departing from the spirit and scope of our invention and hence we do not wish to limit ourselves to the exact disclosures hereof.

What we claim is:—

1. A double disk grain drill comprising a support provided with opposite side seats having forwardly converging curved faces, a pair of disks having their journals abutting against said seats and adjustable forwardly thereon to maintain the desired contact between front portions of their cutting edges, a guard rigid with said support and extending forwardly over said disks and downwardly in front thereof and means for independently securing said journals to said seats.

2. A double disk grain drill having forwardly converging rotary disks independently rockable laterally to maintain contact between front portions of their edges, a boot carrying said disks and provided with a guard extending forwardly over said disks and downwardly at the front thereof and terminating above the point of contact between said disks, and adjustable mountings for said disks.

3. In combination, a support embodying a boot and provided with opposite forwardly converging side faces, inclined forwardly-converging rotary disks between which said boot is arranged, said disks provided with and carried by means forming the axes on which the disks rotate, said means abutting against and adjustable on said faces to maintain contact between front portions of the disk edges, said boot provided with a guard over said disks and depending at the front thereof, and adjustable clamping devices for said means, respectively, for independently securing and adjusting the same.

4. In combination, a vertically disposed boot provided with a forwardly and downwardly extending guard, said boot formed with opposite side curved forwardly converging seats, a pair of inclined forwardly converging rotary disks arranged under said guard and on opposite sides of said boot, each disk carried by and provided with means forming the axis on which the disk rotates, and securing and adjusting devices for said means, respectively, for independently securing said means to and permitting forward adjustment thereof on said seats.

5. In combination, in a double disk grain drill, a boot formed with opposite side longitudinally curved seats, a pair of rotary furrow opener disks, said disks provided with, carried by and rotating on bearing blocks having ends bearing against, conforming to and longitudinally adjustable on said faces, a guard depending at the front of said disks and adjustable securing devices for independently securing said blocks, respectively, to said support and in the desired adjustment on said seats.

6. In combination, in a double disk grain drill, a support comprising a boot and formed with a pair of opposite side longitudinally curved forwardly converging seats, a pair of rotary forwardly converging disks contacting at front portions of their edges, a guard to exclude trash from the space between the front portions of said disks, bearing blocks carrying and on which said disks rotate, said blocks having projecting end bosses abutting against said seats, respectively, and adjustable longitudinally thereof to change the angles of their axes, and adjustable means for clamping said blocks to said seats.

7. In a grain drill, in combination, a boot having a pair of opposite forwardly curved seats, a pair of inclined rotary disks, each provided with and carried by a bearing block on which it rotates, said blocks provided with ends conforming to, abutting against and adjustable along said seats to determine the angles of inclination of the disks, said seats and block ends formed to hold the blocks against rotation, a guard arranged in front of said disks and means adjustably and independently, clamping said blocks to said seats.

8. In a grain drill, in combination, a boot having opposite side faces longitudinally convexed, a pair of inclined rotary disks arranged to contact at the front lower portions of their edges, each disk provided with a journal box having a normally closed opening at its outer side, bearing blocks in said boxes having depressions in their outer ends and bosses projecting from their inner ends and abutting against and adjustable longitudinally of said convexed side faces to determine the relative angles of inclination of said disks and to maintain said portions of the disks in contact, each face and boss formed to prevent rotation of the blocks, and means for independently securing said blocks in adjusted position comprising nuts arranged in said depressions and accessible through said openings.

9. In a grain drill, in combination, a pair of inclined forwardly converging rotary disks contacting at front portions of their edges, a boot extending down between said disks, said boot provided with a guard arranged over said disks and depending at the front edges thereof, and means for independently mounting said disks on and to said boot, comprising adjustable devices whereby said disks can be independently adjusted to swing their axes of rotation and carry their rear portions outwardly and their front portions inwardly, and thereby vary the angle of either disk axis with respect to the other, to maintain the desired contact between the front portions of the disk edges without materially advancing the front edges of the disks.

10. In a grain drill, in combination, a boot having opposite side longitudinally convexed seats, a pair of forwardly converging disks between which the boot is arranged, a guard fixed with respect to said boot and arranged over said disks and depending in advance of the front edges thereof, means forming the axes on which said disks rotate and whereby the disks are confined, said means abutting against said seats and adjustable longitudinally thereof to determine the angle of inclination of either disk axis in maintaining contact between front portions of the disk edges, and adjustable clamping devices for independently securing said means to said boot and at the desired longitudinal position on said seats, respectively.

11. In a double disk grain drill, in combination, a boot, a pair of inclined forwardly converging rotary disks confined to and arranged at opposite sides of said boot, said boot provided with a guard over the disks and depending at the front edges thereof and arranged closely to said edges to exclude trash, and independent mountings for said disks, forming inclined axes on which the disks rotate and comprising adjustable securing means whereby either disk can be independently swung to rock its axial line of rotation forwardly approximately on a remote center and swing the rear portion of the disk outwardly and its front portion inwardly into contact with the edge portion of the other disk without substantial bodily forward movement of the disk.

12. In a double disk grain drill, in combination, a support having opposite-side faces formed with longitudinal guideways, said faces being longitudinally convexed to converge rearwardly at their rear portions and forwardly at their front portions, a pair of forwardly converging disks adapted to engage at their lower front edge portions, said disks provided with and rotating on bearing blocks abutting against and adjustable longitudinally of said faces to independently rock said disks to vary the relative angular positions of their axes and maintain the contact between the lower front edge portions of the disks without substantial bodily forward movement of the disks, clamping bolts, and nuts for securing said blocks to said support and in the desired adjustment on said faces, said support embodying a seed tube between said disks and a guard depending at the front thereof.

13. In combination, in a double disk grain drill, a pair of inclined rotary disks arranged to contact at the lower front portions of their edges, a support extending down between said disks and having opposite side faces longitudinally convexed to converge rearwardly at their rear portions and forwardly at their front portions, bearing blocks carrying said disks and having portions abutting against and adjustable longitudinally of said convexed side faces to maintain said lower front portions of the disks in contact with a minimum adjustment of either disk longitudinally of said side faces and means for independently securing said blocks in adjusted positions on said faces.

14. In a double disk grain drill, in combination, a support having opposite-side seats formed with longitudinal slots having enlarged portions, bolts extending outwardly through said slots and having their heads confined in said support and movable longitudinally of said slots, said bolts being removable through said enlarged portions, bearing blocks removably and adjustably bearing against said seats, said bolts extending outwardly through said blocks and having nuts for clamping the blocks to the seats, and a pair of forwardly converging rotating disks confined by and rotating on said blocks.

15. In combination, in a double disk grain drill, a pair of inclined rotary disks arranged to contact at the lower front portions of their edges, a vertically-disposed boot arranged between said disks in rear of the vertical plane including the axes of said disks and having its lower discharge end extended forwardly below the horizontal plane including the axes of said disks to discharge the grain forwardly toward said point of contact between the lower front portions of said disks, said boot having a front extension above said forwardly extended lower end, said front extension having opposite side faces longitudinally convexed, bearing blocks carrying said disks and having portions abutting against and adjustable longitudinally of said convexed side faces to maintain said lower front portions of the disks in contact with a minimum adjustment of either disk longitudinally of said side faces, and means for independently securing said blocks in adjusted positions on said faces.

16. In a double disk grain drill, in combination, a support having a hollow head and longitudinally-convexed opposite-side seats, securing bolts having their heads removably confined in said hollow head and adjustable longitudinally thereof, and projecting outwardly through said seats, and a pair of forwardly converging rotary disks adapted to engage at their lower front edge portions, bearing blocks confined to said disks and on which they rotate, said blocks at their inner ends abutting against said seats and independently adjustable thereon to vary their relative angular positions to maintain said edge portions of their disks in engagement with a minimum movement longitudinally of said head, said bolts extending outwardly through said blocks and provided with nuts to clamp the blocks against the seats.

In testimony whereof we affix our signatures in presence of two witnesses.

WILLIAM ELLIOTT.
HERMAN M. LOEBER.
ROBERT H. SCHLACHTER.

Witnesses:
R. H. YALE,
V. O. RANKIN.